(12) United States Patent
Haddon et al.

(10) Patent No.: US 6,331,262 B1
(45) Date of Patent: Dec. 18, 2001

(54) METHOD OF SOLUBILIZING SHORTENED SINGLE-WALLED CARBON NANOTUBES IN ORGANIC SOLUTIONS

(75) Inventors: Robert C. Haddon; Jian Chen, both of Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 09/401,668

(22) Filed: Sep. 22, 1999

Related U.S. Application Data (60) Provisional application No. 60/102,909, filed on Oct. 2, 1998, and provisional application No. 60/102,787, filed on Oct. 2, 1998.

(51) Int. Cl.$^7$ ............................. H01B 1/24; C09L 1/44; C01B 31/00
(52) U.S. Cl. ................. 252/502; 423/447.1; 423/447.2; 423/460; 423/461
(58) Field of Search ............................. 423/447.2, 445 B, 423/460, 461, 447.1; 252/510, 502

(56) References Cited

U.S. PATENT DOCUMENTS

| | | | |
|---|---|---|---|
| 5,560,898 | 10/1996 | Uchida et al. | 423/447.2 |
| 5,641,466 | 6/1997 | Ebbesen et al. | 423/447.2 |
| 5,695,734 | 12/1997 | Ikazaki et al. | 423/447.1 |
| 5,698,175 | 12/1997 | Hiura et al. | 423/447.1 |
| 5,716,708 | 2/1998 | Lagow | 423/445 R |

OTHER PUBLICATIONS

C. Journet et al., "Large–scale production of single–walled carbon nanotubes by the electric–arc technique," Nature, (Aug. 21, 1997).

A.G. Rinzler et al., "Large–scale purification of single–wall carbon nanotubes: process, product, and characterization," Applied Physics A, p. 29–37, (Nov. 22, 1998).

Erik Dujardin et al., "Purification of Single–Shell Nanotubes," Adv. Mat. Wiley–VCH Verlag GmbH, D–69469 Weinheim, p. 611–613, (Nov. 22, 1998).

Jian Chen et al., "Solution Properites of Single–Walled Carbon Nanotubes," Reports, (Oct. 2, 1998).

Y. Chen et al., "Chemical attachment of organic functional groups to single–walled carbon nanotube material," vol. 13 (No. 9), p. 2423–2431, (Sep. 9, 1998).

Thomas W. Ebbesen, "Cones and Tubes: Geometry in the Chemistry of Carbon," Acc. Chem. Res., American Chemical Society, vol. 31 (No. 9), p. 558–566, (Jul. 17, 1998).

*Primary Examiner*—Stuart L. Hendrickson
(74) *Attorney, Agent, or Firm*—King and Schickli PLLC (57) ABSTRACT

Naked single-walled nanotube carbon metals and semiconductors were dissolved in organic solutions by derivatization with $SOCl_2$ and octadecylamine charge. Both ionic (charge transfer) and covalent solution phase chemistry with concomitant modulation of the single-walled carbon nanotubes (SWNT) band structure were demonstrated. Solution phase near-IR spectroscopy was used to study the effects of chemical modifications on the band gaps of the SWNTs. Reaction of solubilized SWNTs with dichlorocarbene led to functionalization of the nanotube walls.

23 Claims, 8 Drawing Sheets

(10,10) SWNT-CONH(CH$_2$)$_{17}$CH$_3$

(10,10) SWNT-CONH(CH$_2$)$_{17}$CH$_3$

```
┌─────────────────────────────────────────────────────────┐
│ Raw soot (40-60 vol.%) was refluxed in 2-3M nitric acid │
│ for 48 hours (200-300ml 2-3M nitric acid per gram       │
│ of raw soot)                                            │
└─────────────────────────────────────────────────────────┘
                            │
┌─────────────────────────────────────────────────────────┐
│ After centrifugation, the supernatant solution was      │
│ decanted. The precipitation the solid was washed        │
│ several times with distilled water until the pH is      │
│ close to 7 and the supernatant solution was decanted    │
│ each time by centrifugation.                            │
└─────────────────────────────────────────────────────────┘
                            │
┌─────────────────────────────────────────────────────────┐
│ The resulted precipitation was suspended in 0.5% SDS    │
│ aqueous solution by sonication (pH is ajusted to 9-10   │
│ by addition of NaOH). Cotton filtration gave black      │
│ colored suspension.                                     │
└─────────────────────────────────────────────────────────┘
                            │
┌─────────────────────────────────────────────────────────┐
│ Cross-flow filtration:                                  │
│ 1) cartridge:fibres of 0.6mm diameter, 200nm pore       │
│ 2) buffer solution: 0.5% SDS aqueous solution(pH9-10)   │
└─────────────────────────────────────────────────────────┘
                            │
┌─────────────────────────────────────────────────────────┐
│ After cross-flow filtration, HCl was added to the       │
│ suspension to precipitate the SWNTs. After              │
│ centrifugation, the black solid was washed with         │
│ distilled water and ethyl alcohol, and dried at         │
└─────────────────────────────────────────────────────────┘
```

FIG. 10

AP-SWNTs (40-60 vol.%) were refluxed in 70 vol.% nitric acid until the evolution of dense brown vapors ceases. (for 4g raw soot, this usually take 10-12 hours).

After centrifugation, the supernatant liquid was decanted. The solid precipitate was washed several times with distilled water until the pH of the washings is close to 7. The supernatant liquid is removed by centrifugation and decantation.

The resulting solid was washed with ethyl alcohol and dried at room temperature under reduced pressure. The purity of the SWNTs is around 70-80 vol.%.

FIG. 11

The purified SWNTs were sonicated in a mixture (1:2-3) of 70% nitric acid and 98% sulfuric acid for 24-48 hours (500-1000 ml acid mixture per gram of purified SWNTs). The temperature is controlled to be lower than 60°C.

The resulted mixture was diluted 3-4 times by pouring into distilled water. The solid was isolated by membrane filtration (200 nm pore size), washed with a minimum amount of distilled water, and dried at room temperature under reduced pressure to give shortened SWNTs.

FIG. 12

METHOD OF SOLUBILIZING SHORTENED SINGLE-WALLED CARBON NANOTUBES IN ORGANIC SOLUTIONS

This application claims the benefit of U.S. Provisional Application No. 60/102,909 filed Oct. 2, 1998 and U.S. Provisional Application No. 60/102,787 filed Oct. 2, 1998.

This invention was made with Government support under NSF-EPSCOR grant EPS-9452895. The Government may have certain rights in this invention.

TECHNICAL FIELD

The present invention relates to the dissolution of single walled carbon nanotubes in solutions and more particularly, to a method of dissolving naked single walled nanotube carbon metals and semiconductors in organic solutions.

BACKGROUND OF THE INVENTION

All previous work on carbon nanotubes (both single-walled and multi-walled), has been carried out on the usual intractable, insoluble form of this material [Yakobson, B. I.; Smalley, R. E., Fullerene Nanotubes: C1,000.000 and Beyond. American Scientist 1997, 85, 324–337.] This form of the material is not amenable to many of the processing steps that are necessary if the single-walled carbon nanotubes (SWNTs) are to reach their full potential—particularly in applications that require these materials in the form of polymers, copolymers, composites, ceramics and moldable forms.

While present forms of the SWNTs can be heterogeneously dispersed in various media, the interactions between the SWNTs and host and between the SWNTs themselves are simply physical, and without the formation of chemical bonds. Thus, the advantageous properties of the SWNTs are unlikely to be realized on a macroscopic level. What is needed is a method to prepare well-dispersed forms of SWNTs perhaps by inducing them to exfoliate from the bundles and dissolve in organic solvents. Although long believed to be impossible, [Ebbesen, T. W., Cones and Tubes: Geometry in the Chemistry of Carbon. Acc. Chem. Res. 1998, 31, 558–566] we now teach such a procedure for the dissolution of SWNTs [Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98].

SUMMARY OF THE INVENTION

Accordingly, it is a primary object of the present invention to overcome the above-described limitations and disadvantages of the prior art by providing (1) a method of solubilizing single-walled carbon nanotubes; and (2) solutions of single-walled carbon nanotubes dissolved in an organic solvent. Such solutions are anticipated to be useful in determining the functionalization chemistry of the open ends, the exterior walls or convex face and the interior cavity or concave face of single-walled carbon nanotubes and processing useful nanotube based polymer, copolymer and composite products and devices for a multitude of applications in various industries including aerospace, battery, fuel cell, healthcare and electromagnetic radiation shielding.

Advantageously, as a result of the present invention, functionalization chemistry of the SWNTs can be determined through the study of both the ionic and covalent solution phase chemistry with concomitant modulation of the single wall nanotube band structure.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a novel and improved method of dissolving single-walled carbon nanotubes and semiconductors in common organic solutions is provided. The method comprises purifying the single-walled carbon nanotubes and terminating ends thereof with carboxylic acid groups. This is followed by shortening the single-walled carbon nanotubes to a length of between substantially 1–1000 nm. Next is the polishing of the single-walled carbon nanotubes. Then follows the converting of the carboxylic acid groups on the ends to acid chloride groups. This is followed by the reacting of the single-walled carbon nanotubes with an amine or alkylaryl amine having a formula $RNH_2$, or $R_1R_2NH$ wherein R, $R_1$ and $R_2=(CH_2)_nCH_3$ where n=9–50 or R, $R_1$ and $R_2=(C_6H_4)(CH_2)_nCH_3$ where n=5–50. The final step is the dissolving of the reacted single-walled carbon nanotubes in the organic solvent. More preferably, $RNH_2$ is a compound selected from a group including octadecylamine, 4-dodecylaniline, 4-tetradecylaniline and any mixtures thereof.

The terminating step may be further described as the adding of a mineral acid (eg. HCl, $HNO_3$, $H_2SO_4$) to an aqueous suspension of purified SWNTs to protonate the ends. The converting and reacting steps may be more specifically described as including (1) reacting of the carboxylic acid groups on the ends of the SWNTs with a reagent selected from a group consisting of $SOCl_2$, $PCl_5$ and any mixtures thereof to induce acid chloride conversion, (2) the mixing of the acid chloride converted SWNTs with the amine or alkylarylamine either without solvent or in an appropriate solvent (eg. toluene, chlorobenzene, dichlorobenzene, dimethylformamide, hexmethylphosphoramide, dimethylsulfoxide and any mixtures thereof) and (3) the heating of the resulting mixture to a temperature between 50°–200° C. and more preferably 90°–100° C. Preferably, the heating is maintained for a least 96 hours during which the reaction is completed.

In accordance with yet another aspect of the present invention, a novel solution is provided comprising single-walled carbon nanotubes dissolved in an organic solvent. That organic solvent is preferably an aromatic or chlorinated solvent. Solvents in which the SWNTs of the present invention may be solubilized include but are not limited to chloroform, dichloromethane, benzene, toluene, chlorobenzene, 1,2-dichlorobenzene, dichlorocarbene, ether, tetrahydrofuran and mixtures thereof. The single-walled carbon nanotubes dissolved in the organic solvent have a length between 1–1000 nm and a diameter between 0.5–100 nm and are connected via amide linkages to branched or unbranched alkyl chains of 5 and more preferably 9 or more carbon atoms in length.

Advantageously, such a solution not only allows the study of the functionalization chemistry of the ends, the exterior walls or convex face and the interior cavity or concave face of the nanotubes, but also processing of the nanotubes into useful products for various applications including as intermediates in the preparation of polymer, copolymer and composite materials.

Still other objects of the present invention will become apparent to those skilled in this art from the following description wherein there is shown and described a preferred embodiment of this invention, simply by way of illustration of one of the modes and alternate embodiments best suited to carry out the invention. As it will be realized, the invention is capable of still other and different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention, and together with the description serve to explain the principles of the invention. In the drawing.

Reference will now be provided in detail to the present preferred embodiment of the invention, an example of which is illustrated in the accompanying drawings.

DETAILED DESCRIPTION OF THE INVENTION

In the novel method of the present invention, we begin with raw, as prepared, SWNT soot (AP-SWNTs) which may be, obtained from CarboLex, Inc. of Lexington, Ky. This is prepared by use of an electric arc technique similar to that described by Joumet, C.; Maser, W. K.; Bernier, P.; Loiseau, A.; Lamy de la Chappelle, M.; Lefrant, S.; Deniard, P.; Lee, R. and Fischer, J. E., in Large Scale Production of Single-Walled Carbon Nanotubes by the Electric-Arc Technique. Nature 1997, 388, 756–758. The estimated purity of this material is 40–60% SWNT by volume. Batches of 10 grams may be prepared in a single run and there is considerable scope for further increase in scale. Thus it is possible to contemplate the very large-scale production of this material in the future. We describe herein routes to soluble SWNTs (s-SWNTs), starting from AP-SWNTs.

In the most preferred embodiment of this procedure, the AP-SWNTs are (1) Purified, (2) Shortened, (3) Polished, (4) Converted from the carboxylic acid-terminated form to the acid chloride-terminated form, and (5) Converted from the acid chloride-terminated form to the long chain amide-terminated form, during which the bundles are exfoliated into a mixture of individual SWNTs and small bundles of SWNTs. This latter material is soluble in a number of organic solvents and is thus suitable for further chemical reactions. The chemical reactions used to effect this transformation of the carboxylic acid functionalized SWNTs are shown below.

Purification is a desired step because the AP-SWNTs contain extraneous material, beside the approximately 40–60% SWNTs by volume. In particular the AP-SWNTs contain metal catalyst (nickel and yttrium), nanoparticles (carbonaceous particles sometimes containing metals), graphite, amorphous carbon, fullerenes and other contaminants.

Figure 10:
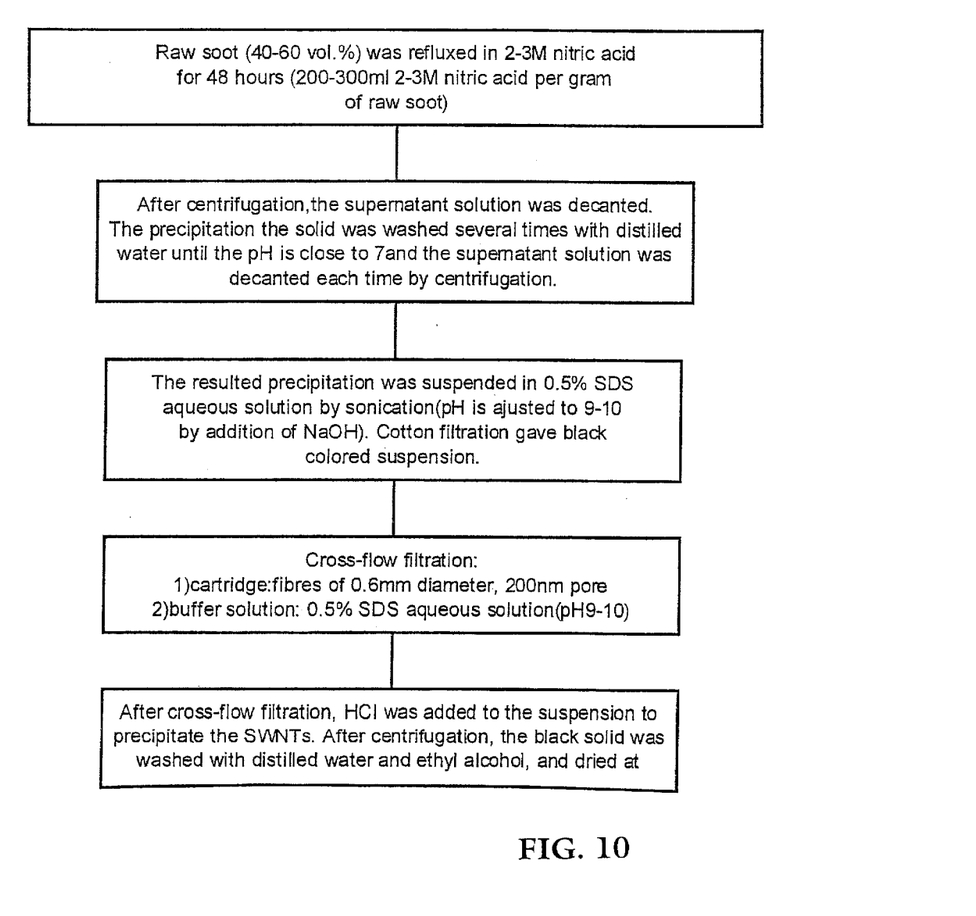
FIG. 10 is a block diagram illustrating a first procedure for purifying the SWNTs.

A first purification procedure is illustrated in FIG. 10. This procedure is a variation of a previously.published method [Liu, J.; Rinzler, A. G.; Dai, H.; Hafner, J. H.; Bradley, R. K.; Boul, P. J.; Lu, A.; Iverson, T.; Shelimov, K.; Huffnan, C. B.; Rodriguez-Macias, F.; Shon, Y.-S.; Lee, T. R.; Colbert, D. T.; Smalley, R. E., Fullerenes Pipes. Science 1998, 280, 1253–1255] [Rinzler, A. G.; Liu, J.; Dai, H.; Nilolaev, P.; Huffman, C. B.; Rodriguez-Macias, F. J.; Boul, P. J.; Lu, A. H.; Heymann, D.; Colbert, D. T.; Lee, R. S.; Fischer, J. E.; Rao, A. M.; Eklund, P. C.; Smalley, R. E., Large-Scale Purification of Single-Wall Carbon Nanotubes: Process, Product and Characterization. Appl. Phys. A 1998, 67, 29–37].

AP-SWNTs (40–60 vol. % of SWNTs) are refluxed in 2–3M nitric acid for about 48 hours (200–300 ml 2–3M nitric acid per gram of AP-SWNTs). After centrifugation, the supernatant solution is decanted. The pH of the solid is adjusted to about 7 by monitoring the pH of the supernatant liquid through repeated cycles of washing, centrifugation and decantation.

The resulting solid is suspended in an 0.5% aqueous solution of sodium dodecyl sulfate (SDS) by sonication for 2–4 hours (200–400 ml surfactant solution per gram of AP-SWNTs); the solution pH is then adjusted to 9–10 by addition of sodium hydroxide. Filtration through a cotton plug gives a black-colored suspension.

The resulting suspension is subjected to cross-flow filtration (CFF). The CFF cartridge has the following specifications: fiber diameter of 0.6 mm, pore size of 200 nm and surface area of 0.56 m². The buffer solution is made up to contain 0.5% SDS at a pH of 9–10 (adjusted by addition of NaOH). Initially the filtrate is black. The CFF is halted when the filtrate has become light brown. HCl is added to the resulting suspension to terminate the ends of the SWNTs with carboxylic acid groups (~COOH $v_{C=O}$=1719 cm$^{-1}$) rather than carboxylate groups (~COO$^-$, $v_{C=O}$=1620 cm$^{-1}$).

After centrifugation, the black solid is washed with distilled water and ethyl alcohol and dried at room temperature. The purity of the resulting SWNTs is around 90 vol. %, and the yield is 10–30% (based on AP-SWNTs).

A specific example of this purification procedure is found below in Example 1.

EXAMPLE 1

AP-SWNTs (6.3 g) were refluxed in 700 mL of 2 M HNO$_3$ for 48 hrs (oil bath at 130° C.). The mixture was centrifuged at 2000 rpm for 30 min. The acid layer was discarded and the solid was washed with water and then mixed into a 0.5% wt. solution of SDS in water (1500 mL). NaOH was added to the solution until the pH was above 10. The mixture was sonicated for 10 hrs. The suspension was acidified with HCl so that the acid form of the SWNTs precipitated and then it was centrifuged at 2000 rpm for 30 min. The water layer was decanted and passed through a membrane filter, pore size 1.2 $\mu$m. The solid slurry was then subjected to membrane filtration. Yield: 2.35 g.

Figure 11:
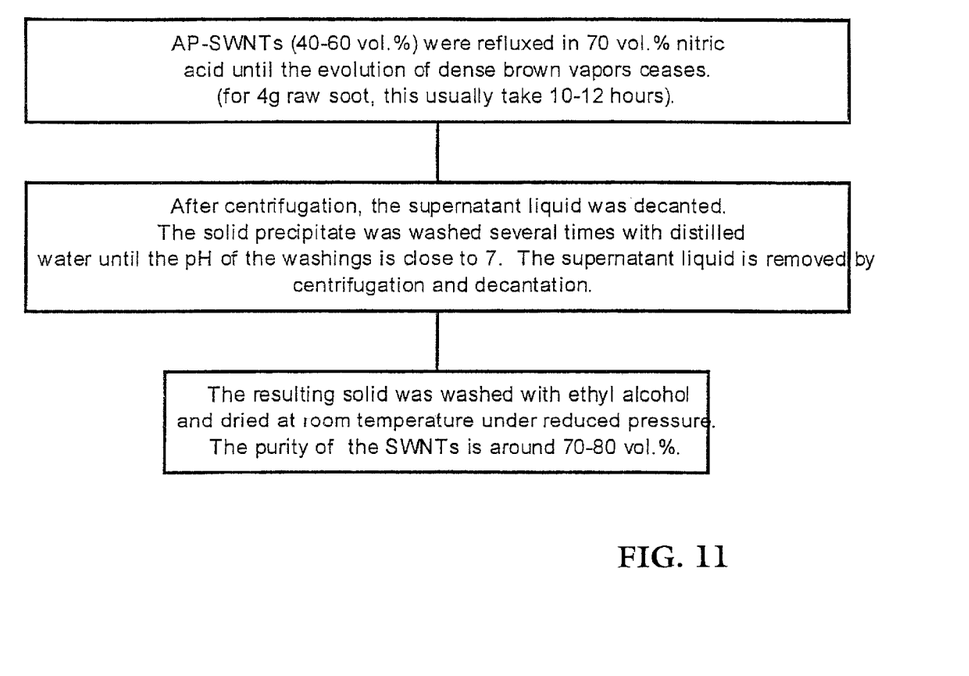
FIG. 11 is a block diagram illustrating a second procedure for purifying the SWNTs.

A second or alternative purification procedure is illustrated in FIG. 11. This procedure is also a variation of a previously published method [Ebbesen, T. W.; Dujardin, E.; Krishnan, A.; Treacy, M. M. J., Purification of Single-Shell Nanotubes. Adv. Mater. 1998, 10, 611–613]. It is simpler, but less complete than the first purification procedure.

AP-SWNTs (40–60 vol. % of SWNTs) are refluxed in 70% nitric acid until the emission of dense brown vapors ceases (for 4 g AP-SWNTs, this usually takes 10–12 hours). After centrifugation, the brow-colored supernatant solution is decanted. The pH of the solid is adjusted to about 7 by monitoring the pH of the supernatant liquid through repeated cycles of washing, centrifugation and decantation.

The resulting solid is washed with ethyl alcohol and dried at room temperature under reduced pressure. The purity of the SWNTs is around 70–80 vol. %, and the yield is 40–50%.

Figure 12:
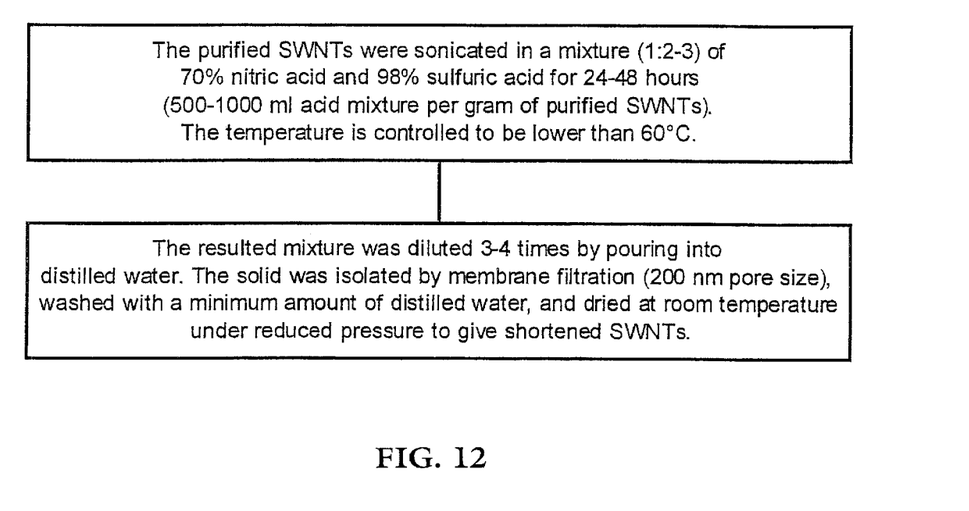
FIG. 12 is a block diagram illustrating a first preferred method for shortening purified SWNTs.

The next step is the shortening of the SWNTs (see illustration in FIG. 12). This aids in their dissolution in organic solvents.

A first shortening technique is a variation of a previously published method. [Liu, J.; Rinzler, A. G.; Dai, H.; Hafner, J. H.; Bradley, R. K.; Boul, P. J.; Lu, A.; Iverson, T.; Shelimov, K.; Huffman, C. B.; Rodriguez-Macias, F.; Shon, Y.-S.; Lee, T. R.; Colbert, D. T.; Smalley, R. E., Fullerenes Pipes. Science 1998, 280, 1253–1255] [Rinzler, A. G.; Liu, J.; Dai, H.; Nilolaev, P.; Huffman, C. B.; Rodriguez-Macias, F. J.; Boul, P. J.; Lu, A. H.; Heymann, D.; Colbert, D. T.; Lee, R. S.; Fischer, J. E.; Rao, A. M.; Eklund, P. C.; Smalley, R. E., Large-Scale Purification of Single-Wall Carbon Nanotubes: Process, Product and Characterization. Appl. Phys. A 1998, 67, 29–37.] After this process the SWNTs are reduced to lengths in the range 100–300nm.

The purified SWNTs (70–80%) are sonicated in a 1:2–3 mixture of 70% nitric acid and 90% sulfuric acid for 24–48 hours (500–100 ml acids per gram of purified SWNTs). The temperature is controlled to be lower than 60° C.

The resulting mixture is diluted 3–4 times by pouring into distilled water and cooled to room temperature. The solid is isolated by membrane filtration (100–200 nm pore size), washed with a minimum amount of distilled water, and dried at room temperature under reduced pressure to give shortened SWNTs (40–60% yield based on purified SWNTs).

EXAMPLE 2

0.387 g of purified SWNTs were sonicated in 40 mL of 3:1 H$_2$SO$_4$ (concentrated) to HNO$_3$ (concentrated) for 24 hours. Distilled water (200 mL) was added to the mixture, and it was filtered (membrane pore sizes 0.2 $\mu$m), washed with water and dried. Purified, shortened SWNTs: 0.273 g.

In accordance with a second, alternative approach, the purified SWNTs are stirred in a 3:1 mixture of 98% sulfuric acid and 70% nitric acid at 60–80° C. for 10–30 minutes (100 ml acid per gram of purified SWNTs). The resulting mixture is diluted 3–4 times by pouring into distilled water. After membrane filtration (200 nm pore size), the black solid is washed with distilled water, and dried at room temperature under reduced pressure.

The black solid is probe-sonicated in 5–15% ammonium persulfate aqueous solution for 6–12 hours (60–120 g ammonium persulfate per gram of purified SWNTs). After membrane filtration (200 nm pore size), washing with distilled water and ethyl alcohol, drying at room temperature under reduced pressure, the shortened SWNTs are obtained. 30–50% yield based on purified SWNTs.

The Raman spectrum of the shortened SWNTs ($\omega_r$=161, $\omega_t$=1595 cm$^{-1}$, $\omega_r$ and $\omega_t$ represent the Raman-active radial mode and tangential mode frequencies of SWNTs) is close to that of raw soot ($\omega_r$=162, $\omega_t$=1592 cm$^{-1}$). Because the Raman radial mode of the SWNTs is sensitive to the diameter, but not to the symmetry of the nanotube, based on $\omega_r$(cm$^{-1}$)=223.75 (cm$^{-1}$nm)/d (nm), the average diameter of the shortened SWNTs in a typical sample is estimated to be 1.38 nm.

Next is the polishing of the SWNTs. It is hypothesized that the polishing step removes polar hydroxylic functionality from the processed SWNTs. These hydroxylic species may be physically or chemically attached to the purified, shortened SWNTs. At the end of this treatment the SWNTs are less hydrophilic (less susceptible to forming aqueous dispersions).

Specifically, the purified shortened SWNTs are stirred in a 4:1 mixture of 90% sulfuric acid and 30% hydrogen peroxide at 60–80° C. for 20–35 minutes (300–500 ml of liquid per gram of purified, shortened SWNTs).

The resulting mixture is diluted 3–4 times by pouring into distilled water and cooled to room temperature. After membrane filtration (100–200 nm pore size), washing with distilled water and ethyl alcohol, and drying at room temperature under reduced pressure, the polished shortened SWNTs are obtained (40–50% yield based on purified, shortened SWNTs).

EXAMPLE 3

0.42 g of purified, shortened SWNTs were heated at 70° C. in 50 mL of 4:1 H$_2$SO$_4$ (90%) to H$_2$O$_2$ (30%) for 15 minutes. Water (300 mL) was added to the mixture, and it was filtered (membrane pore size 0.2 μm), washed with water and dried. Mass: 0.16 g.

The next step in the method of solubilizing is to react the carboxylic acid groups on the ends of the polished shortened SWNTs with an amine or alkylaryl amine having the formula $RNH_2$ or $R_1R_2NH$, wherein R, $R_1$ and $R_2=CH_3(CH_2)_n$, where n=9–50 or R, $R_1$ and $R_2=(C_6H_4)(CH_2)_n CH_3$ where n=5–50 via the formation of an amide linkage. To achieve this end, the polished, shortened SWNTs are first stirred in thionyl chloride (containing 1–10% DMF) at 70–110° C. for 24–48 hours (40–60 ml of thionyl chloride per gram of SWNTs). After centrifugation, the brown-colored supernatant is decanted. The solid is washed with anhydrous THF, and after centrifugation, the supernatant is decanted. The resulting solid is dried at room temperature under reduced pressure. Yield of polished, shortened SWNT-COCl:>90% yield based on polished, shortened SWNTs.

EXAMPLE 4

1.90 g of purified, shortened, polished SWNTs were heated in 40 mL of thionyl chloride ($SOCl_2$) and 12 drops of dimethylformamide (DMF), at 70° C. for 24 hours. The mixture was centrifuged at 2000 rpm for 20 minutes. The $SOCl_2$ layer was decanted, and the solid washed with tetrahydrofuran (THF). The centrifugation was repeated and the THF layer was again decanted. The solid was dried under vacuum. Mass recovered: 1.82 g.

Next, the SWNT-COCl is reacted with an amine or alkylarylamine. Specifically, a mixture of the shortened, polished SWNT-COCl and excess long chain amine having a formula RNH2 or $R_1R_2NH$ wherein R, $R_1$ and $R_2=(CH_2)_n CH_3$ where n=9–50 or R, $R_1$ and $R_2=(C_6H_4)(CH_2)_n CH_3$ where n=5–50 is heated at 70–180° C. for 48–144 hours. Examples of specific amine and alkylarylamine compounds that may be utilized in the present invention include but are not limited to octadecylamine, 4-dodecylaniline, 4-tetradecylaniline and any mixtures thereof. The excess long chain amine/alkylarylamine is removed by repeated washing with ethyl alcohol. The remaining solid is treated with dichloromethane, and after filtration, the black-colored filtrate is concentrated on a rotary evaporator. Ethyl alcohol is added to the resulting concentrated solution to precipitate the SWNTs. After membrane filtration, the black solid is washed with ethyl alcohol and dried at room temperature under reduced pressure. Yield of shortened-soluble-SWNT-long-chain-amide: 50–90%, based on polished, shortened SWNTs.

EXAMPLE 5

1.90 g of purified, shortened, polished SWNTs were heated in 40 mL of thionyl chloride ($SOCl_2$) and 12 drops of dimethylformamide (DMF), at 70° C. for 24 hours. The mixture was centrifuged at 2000 rpm for 20 minutes. The $SOCl_2$ layer was decanted, and the solid washed with tetrahydrofuran (THF). The centrifugation was repeated and the THF layer was again decanted. The solid was dried under vacuum. Mass recovered: 1.82 g.

Figure 9:
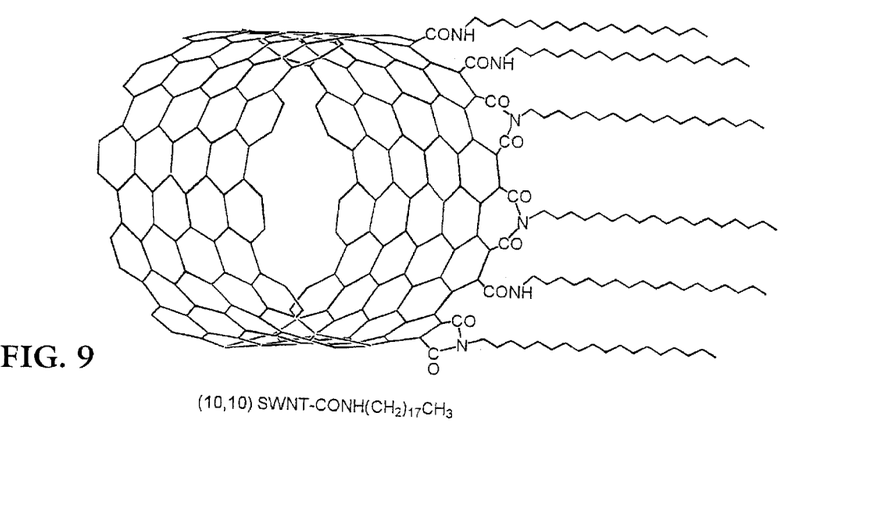
FIG. 9 schematically illustrates the structure of the end of a SWNT following functionalization.

In sharp contrast to unprocessed shortened SWNTs which are insoluble in organic solvents, the processed shortened SWNTs of the present invention include long alkyl chains (branched or unbranched) that provide substantial solubility in chloroform, di-chloromethane, aromatic solvents such as benzene, toluene, chlorobenzene and 1,2 di-chlorobenzene, and carbon disulfide ($CS_2$) (see, for example, FIG. 9). In fact, the solubilities of the processed soluble single-walled carbon nanotubes (s-SWNTs) in 1,2 di-chlorobenzene and $CS_2$ are greater than 1 mg/ml. The black-colored unsaturated solution of s-SWNTs is visually non scattering, and no precipitation is observed upon prolonged standing. Like fullerenes, the s-SWNTs are insoluble in water, ethanol and acetone. The IR spectrum of soluble s-SWNTs indicates the formation of the amide bond: $v_{C=O}=1663$ cm$^{-1}$ and 1642 cm$^{-1}$.

The following additional examples are presented to further illustrate the invention, which is not to be considered as limited thereto.

EXAMPLE 6

The s-SWNTs were prepared in accordance with the following two step procedure. First, 100 mg of shortened SWNTs were stirred in 20 ml of $SOCl_2$[containing 1 ml dimethylformamide (DMF)] at 70° C. for 24 h. Following centrifugation, a brown-colored supernatant was decanted and the remaining solid was washed with anhydrous tetrahydrofuran (THF). Following further centrifugation, a pale yellow-colored supernatant was decanted. The remaining solid was dried at room temperature under vacuum. Second, a mixture of the resulting SWNTs and 2 g of octadecylamine (ODA, melting point 55 to 57° C.) was heated at generally 50° C. to 200° C. and more preferably 90° C. to 100° C. for 96 hours. After cooling to room temperature, the excess ODA was removed by washing with ethanol (EtOH) 4 times (5 to 10 min sonication at 40 KHz). The remaining solid was dissolved in dichloromethane, and after filtration, the black-colored filtrate was taken to dryness on a rotary evaporator. The resulting black solid was dried at room temperature under vacuum. The yield of s-SWNTs is typically greater than 60% based on shortened SWNTs.

A reaction of SWNT-COCl with excess ODA in toluene at room temperature for several days only produced trace amount of s-SWNTs. One important step contributing to the high-yield preparation of s-SWNTs in the method of the present invention is the application of heat to the mixture of SWNT-COCl and ODA for an extended period of time. During this process, the volume of the SWNTs expands several times, perhaps due to exfoliation of the SWNTs bundles to give individual nanotubes.

In sharp contrast to the as-prepared shortened SWNTs which are insoluble in organic solvents, the s-SWNTs have substantial solubility in chloroform, dichloromethane, aromatic solvents (benzene, toluene, chlorobenzene, 1,2-dichlorobenzene), and $CS_2$. The solubilities of s-SWNTs in 1,2-dichlorobenzene and $CS_2$ are greater than 1 mg/ml. The black-colored or unsaturated solution of s-SWNTs is visually non-scattering, and no precipitation was observed upon prolonged standing. Like fullerenes, the s-SWNTs are insoluble in water, ethanol and acetone. The IR spectrum of soluble SWNTs indicates the formation of the amide bond: $v_{C=O}=1663$ cm$^{-1}$ and 1642 cm$^{-1}$.

Proton nuclear magnetic resonance ($^1$H NMR, 200 MHz, CDCl$_3$) of s-SWNTs showed the presence of the long aliphatic chain at the ends of the SWNTs: δ0.88 (3H, t, CH$_3$), 1.23 (32H, s, 16×CH$_2$). The CH$_2$ group directly attached to the amide group at the ends of the SWNTs shows several broad signals in the range of δ2.0 to 3.5; the integral of all of these signals corresponds to 2H, which suggests the existence of magnetically different types of SWNTs in our samples.

Figure 1:
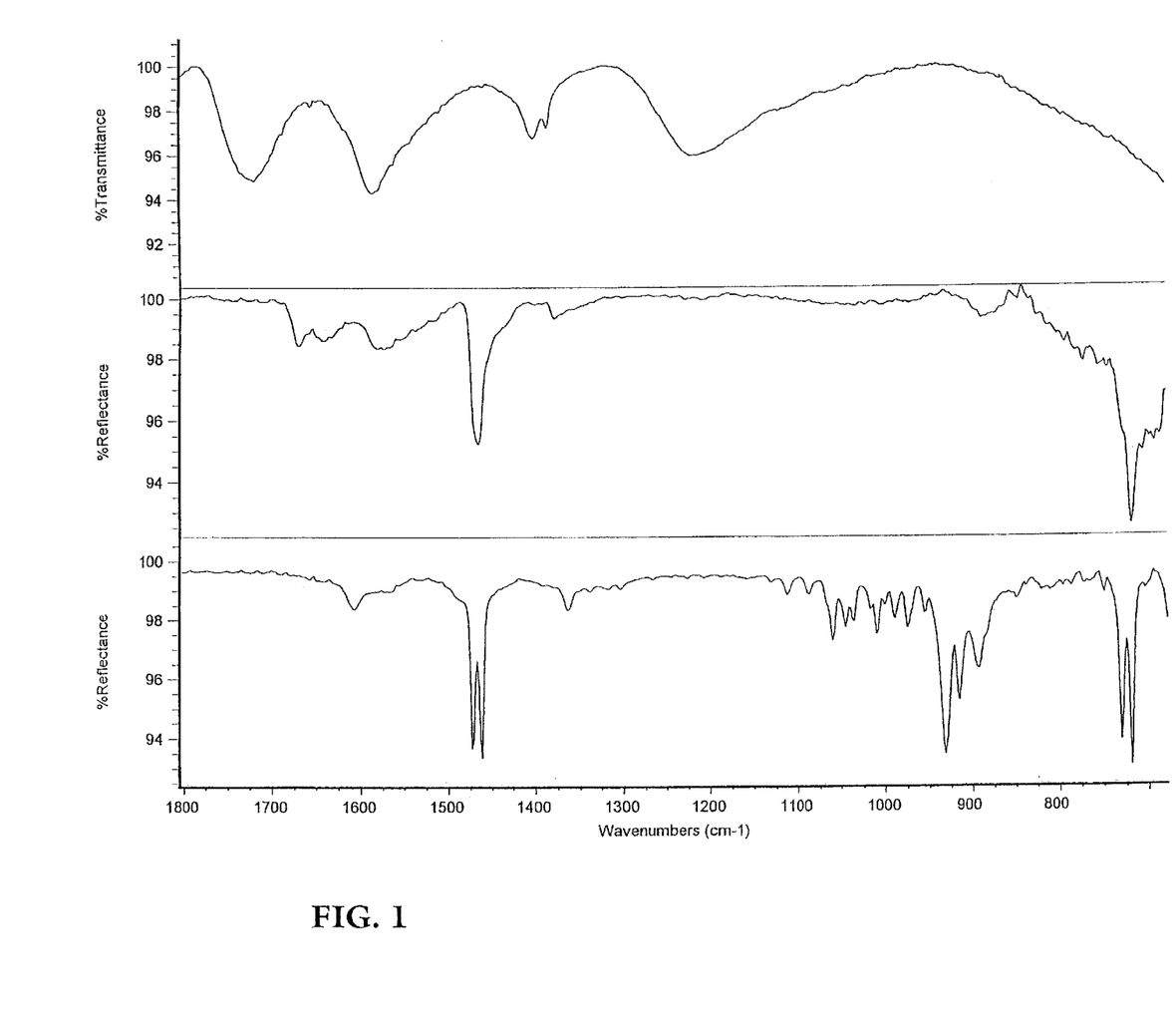
FIG. 1 is the FT-IR spectra (Nicolet Magna-IR 560 E.S.P. spectrometer), of purified SWNTs (top, KBr pellet), s-SWNTs (middle, SpectraTech Thunderdome ATR) and octadecylamine (bottom, ATR), with baseline correction.
Figure 2:
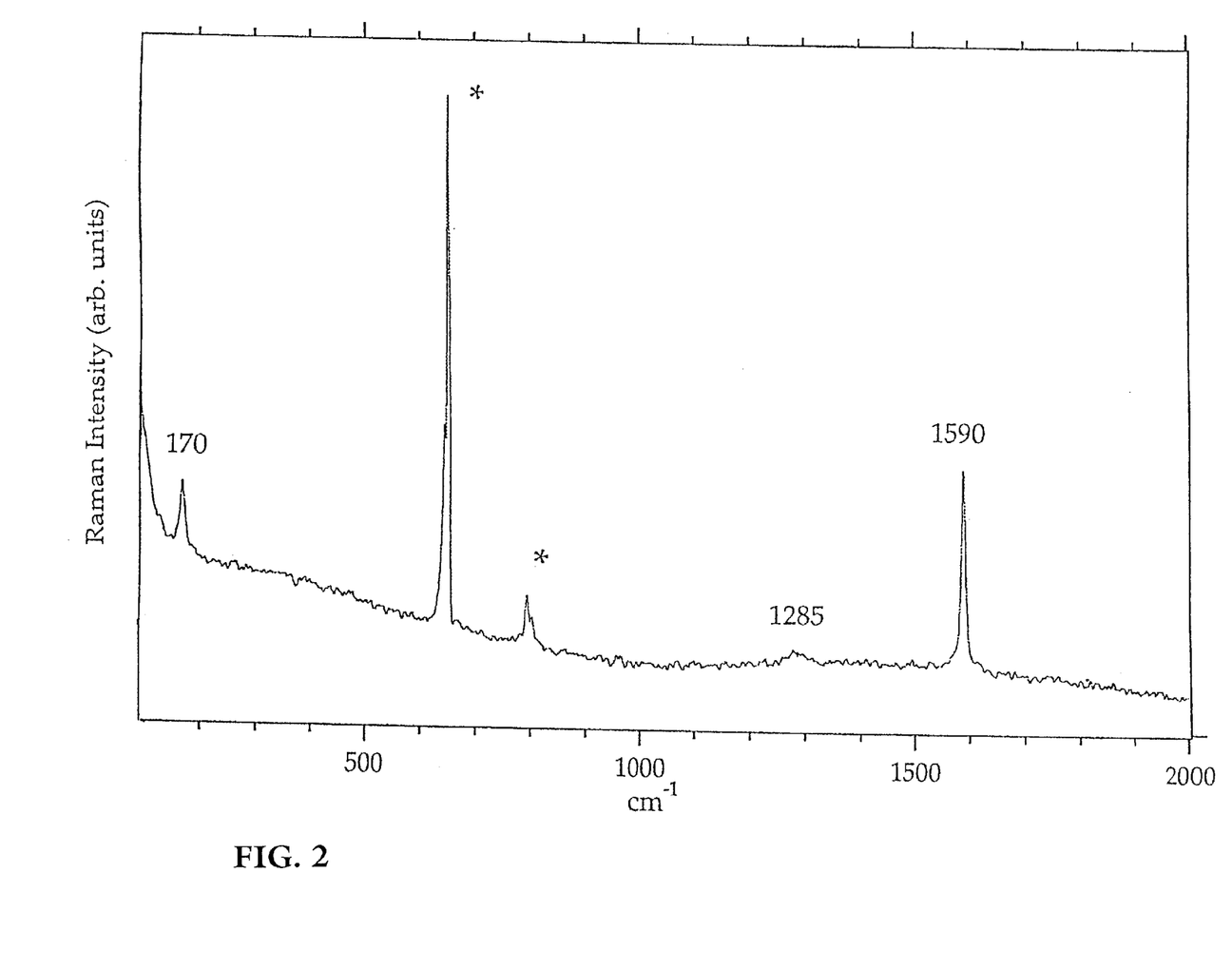
FIG. 2 is FT-Raman spectra (1064 nm excitation from Nd:YAG, BOMEM DA3 spectrometer) of s-SWNT in $CS_2$ solution having peaks labeled with an asterisk due to $CS_2$.

The Raman spectrum of the s-SWNTs in $CS_2$ solution (FIG. 2, $ω_r$=170, $ω_t$=1590 cm$^{-1}$) is similar to that of shortened SWNTs ($ω_r$=161, $ω_t$=1595 cm$^{-1}$), but the radial mode frequency is upshifted 9 cm$^{-1}$ and the tangential mode is downshifted 5 cm$^{-1}$. The origin of this difference is not clear at present. If the upshift in the radial mode frequency reflects purely the difference of nanotube average diameters, then the average diameter of s-SWNTs is estimated to be 1.31 nm. Doping also affects the radial and tangential mode frequencies of SWNTs.

The s-SWNTs in CS$_2$ solution (FIG. 3) showed the presence of three major signals: 9791 cm$^{-1}$ (1.21 eV), 9172 cm$^{-1}$ (1.14 eV) and 5386 cm$^{-1}$ (0.67 eV). The signal at 0.67 eV is due to the band gap transition in semiconducting, chiral nanotubes, which was previously observed by scanning tunneling microscopy (STM) and electron energy loss spectroscopy (EELS). The signal at 1.21 eV was also observed by EELS. Although the features at 1.21 and 1.14 eV correspond to the energy separation of the second pair of singularities in the density of states (DOS) of the semiconducting, chiral SWNTs, these features are more likely to arise from metallic armchair nanotubes, because we found that the relative ratio of the 1.21/1.14 and 0.67 eV signals varies significantly in batches of s-SWNTs originating from different sources of raw soot. If the 0.67 and 1.21/1.14 eV signals came from the energy separation of the first pair and second pair of singularities in semiconducting, chiral SWNTs, then the ratio of 0.67 and 1.21/1.14 eV signals should be constant. In fact, our experimental data (e.g., d=1.31–1.38 nm, $E_{gap}$=1.21 eV, $\omega_r$170 cm$^{-1}$) is in agreement with the calculated data for the metallic, armchair (10,10) SWNT (d=1.36 nm, $E_{gap}$=1.28 eV, $\omega_r$=165 cm$^{-1}$) which suggests that a significant proportion of our sample is (10,10) SWNTs.

EXAMPLE 7

Figure 3:
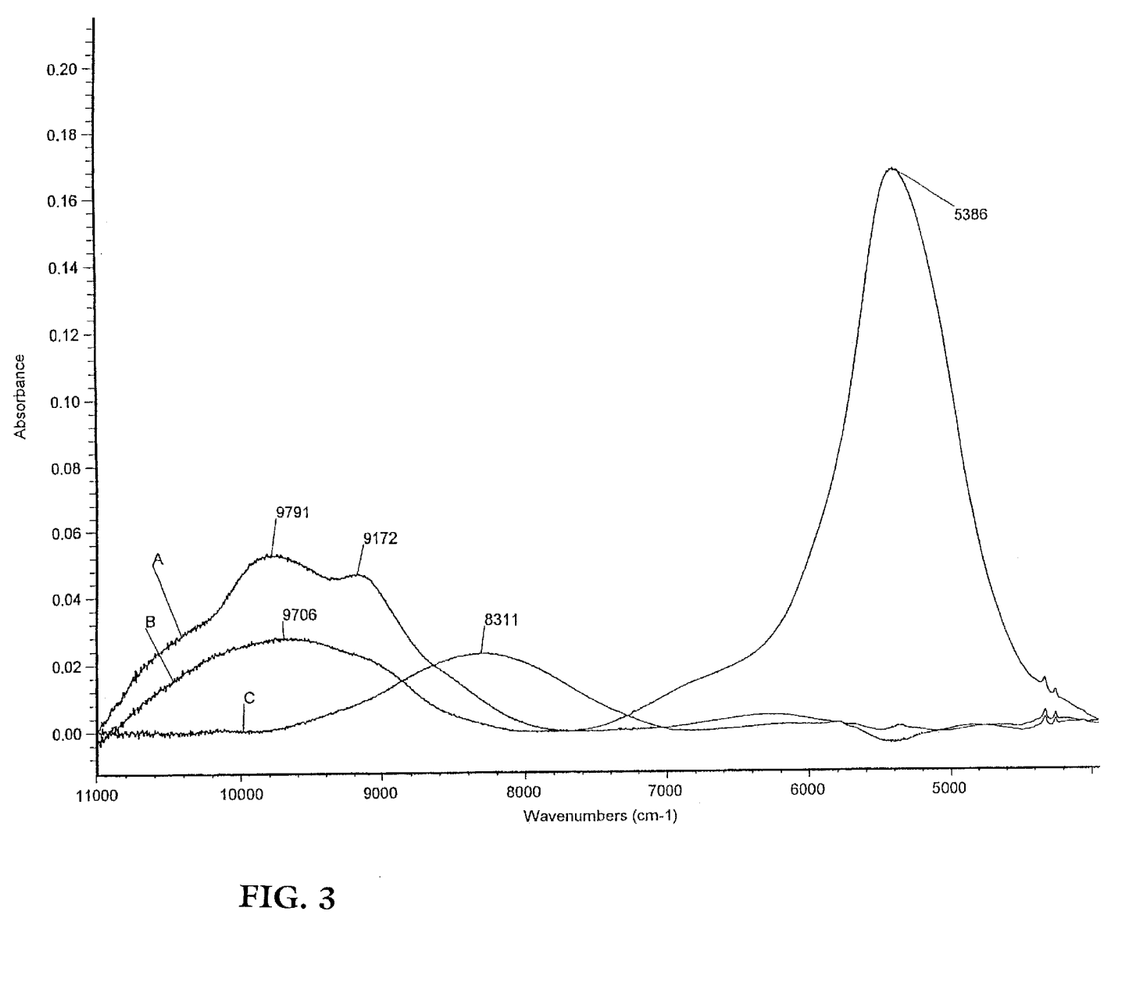
FIG. 3 is the near FT-IR spectra (quartz cell, light path 1/16 in., Nicolet Magna-IR 560 E.S.P. spectrometer) of s-SWNTs in $CS_2$ solution (A), iodine doped s-SWNTs in $CS_2$ solution (B) and bromine doped s-SWNTs in $CS_2$ solution (C). The concentration of s-SWNTs in all solutions is 0.5 mg/ml, and the solvent background was corrected. The solutions were doped to saturation.

Doped SWNTs represent a new family of synthetic metals. Doping may be completed by alkali metals (lithium, sodium, potassium, rubidium or cesium), halogens (chlorine, bromine, or iodine), or metallocenes (bis(cyclopentadienyl)cobalt). Both bromine and iodine doping reduce the resistivity of SWNTs, but there is little information on the nature of the nanotubes and the electronic bands that undergo charge transfer. Both iodine and bromine doping completely remove the feature at 0.67 eV (FIG. 3). We conclude that these oxidants completely deplete the first peak in the DOS of the semiconducting SWNT. Iodine has a relatively minor effect on the other peaks (due to the first peak in the DOS of the metallic SWNTs), whereas bromine has a stronger effect (the broadened peak shifts to 1.03 eV). We assume both oxidants remove the electrons from the metallic band, and perhaps some of the electrons from the first peak in the DOS of the metallic SWNTs. The Raman spectrum of iodine-doped s-SWNTs in CS$_2$ (514.5 nm excitation, $\omega_r$=171, $\omega_t$=1592 cm$^{-1}$) is similar to that of the pristine s-SWNTs, but the bromine-doped s-SWNTs in CS$_2$ ($\omega_r$=251, $\omega_t$=1609 cm$^{-1}$) show the expected up-shifted radial mode and tangential mode frequencies. The similarity in the Raman spectra of the doped s-SWNTs and doped as-prepared SWNTs suggests that the band gap information obtained from doped s-SWNTs can be used to elucidate the origin of the enhanced conductivity of doped as-prepared SWNTs.

Figure 4:
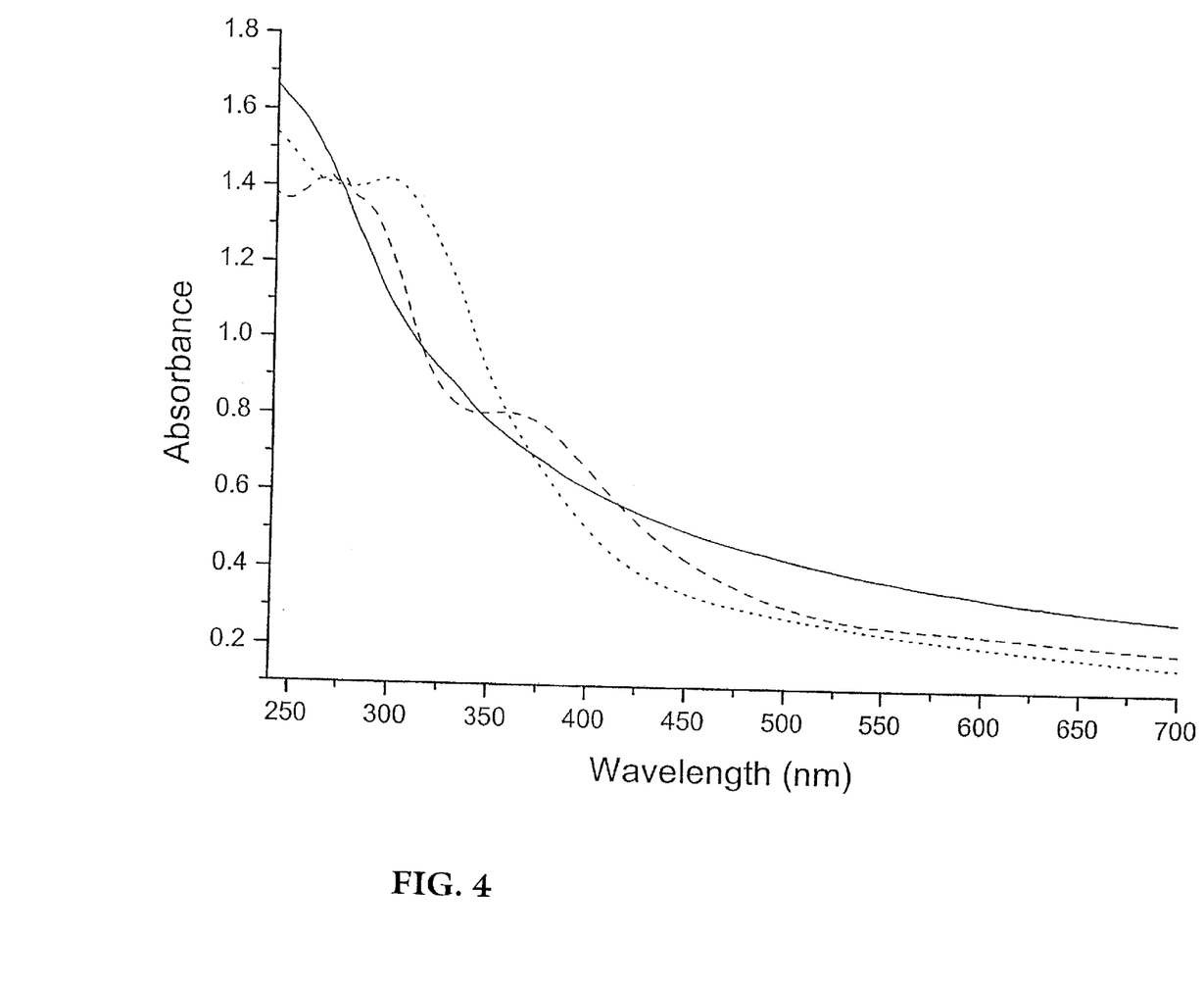
FIG. 4 is the TV-VIS spectra (quartz cell, light path 5 mm, Shimadzu TV-2501PC spectrometer) of s-SWNTs in dichloromethane (solid line, solvent corrected), iodine doped s-SWNTs in dichloromethane (dashed line, iodine and solvent corrected) and dichlorocarbene-functionalized s-SWNTs in dichloromethane (dotted line, solvent corrected). The concentration of s-SWNTs in all solutions is 0.03 mg/ml, and the solutions were doped to saturation.

The ultraviolet-visible (UV-VIS) spectrum of s-SWNT in CH$_2$Cl$_2$ is featureless, with a shoulder around 250 nm (FIG. 4). Upon doping the s-SWNTs with iodine, new bands appear at 268 nm and 357 nm (control experiments exclude the possibility that these features arise from the presence of iodine or triiodide anion).

EXAMPLE 8

The availability of s-SWNT allows us to explore the chemistry of SWNTs. We chose dichlorocarbene (generated from phenyl (bromodichloromethyl) mercury), because it is an electrophilic reagent that adds to deactivated double bonds. Similar reactions have been reported for the fullerenes and for corannulene. We illustrate the reaction as follows:

A mixture of 16 mg of s-SWNTs and 400 mg of PhCCl$_2$HgBr was stirred in 30 ml of toluene at 80° C. under argon for five hours, then 200 mg of PhCCl$_2$HgBr was added and the mixture was stirred at 80° C. for another 12 hours. Another 200 mg of PhCCl$_2$HgBr was added and the mixture was stirred at 80° C. for an additional twenty-four hours. The resulting PhHgBr solid was removed by filtration. The black-colored filtrate was taken to dryness on a rotary evaporator, and the resulting black solid was washed with ethanol and acetone, and dried at room temperature under vacuum to give 5 mg of final product.

Figure 5:
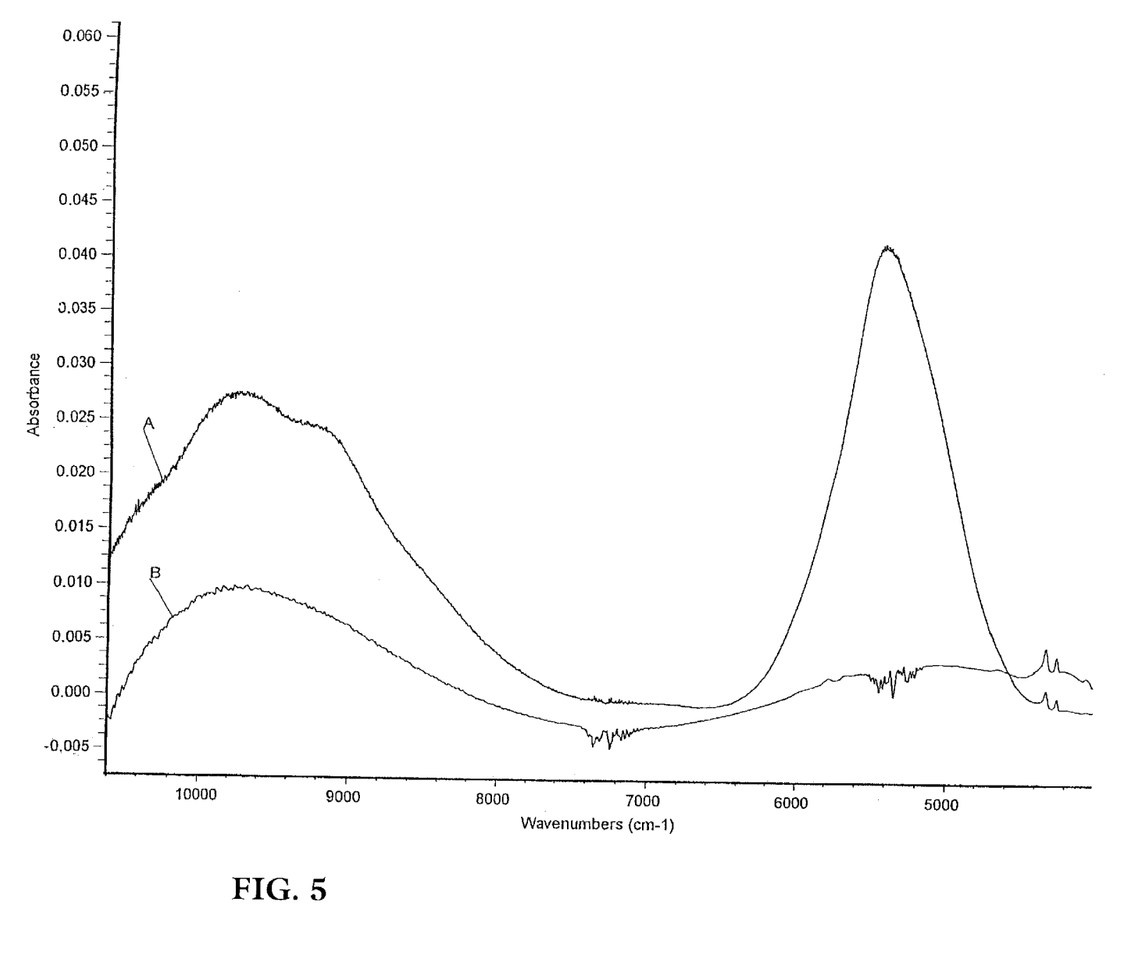
FIG. 5 is the near FT-IR spectra (quartz cell, light path 1 mm) of s-SWNTs in $CS_2$ solution (A) and dichlorocarbene-functionalized s-SWNTs in $CS_2$ solution (B), at the same weight concentration. The s-SWNTs in FIGS. 3 and 5 come from different preparations, so the relative ratio of semiconducting, chiral tubes and metallic armchair tubes is different.

Energy Dispersive X-Ray Spectroscopy (EDS) showed the presence of about 2 atomic % of Cl in the product (the EDS experiments were calibrated with NaCl). The FT-IR spectrum shows the C—Cl stretching mode at 798 cm$^{-1}$. The near-IR signal corresponding to the first electronic transition in the semiconducting SWNTs almost disappears, and the signal intensity of the band due to the metallic armchair tubes decreases significantly (FIG. 5). The UV-VIS spectrum shows a new absorption band at 297 nm (FIG. 4). The SWNT bands could not be discerned above the strong fluorescence signal in the Raman scattering experiments with excitation at 514.5, 647.1 or 1064 nm, which may reflect the change in band structure brought about by the covalent bond formation resulting from addition of dichlorocarbene to the wall of the s-SWNTs. Thus our results suggest that saturation of about 2% of the carbon atoms in the SWNTs, is sufficient to bring about drastic changes in the band electronic structure.

EXAMPLE 9

Electron paramagnetic resonance spectroscopy (EPR), is a very sensitive probe of electronic structure and can provide information on the chemical environment of the unpaired electrons. In this example EPR studies on pristine, purified, shortened and soluble SWNTs in various solution phases were completed.

Preparation of SWNTs Samples for EPR

The AP-SWNT material (obtained from CarboLex, Inc), was synthesized by use of a modified arcing technique for mass production developed at the University of Kentucky. The pristine sample was analyzed using SEM, TEM and Raman and the purity was in the range of 50–70%. The purified SWNTs and shortened SWNTs were prepared using the methods reported by Smalley and coworkers, (Liu, J.;

Rinzler, A. G.; Dai, H.; Hafner, J. H.; Bradley, R. K.; Boul, P. J.; Lu, A.; Iverson, T.; Shelimov, K.; Huffman, C. B.; Rodriguez-Macias, F.; Shon, Y.-S.; Lee, T. R.; Colbert, D. T.; Smalley, R. E., Fullerenes Pipes. Science 1998, 280, 1253–1255) (Rinzler, A. G.; Liu, J.; Dai, H.; Nilolaev, P.; Huffinan, C. B.; Rodriguez-Macias, F. J.; Boul, P. J.; Lu, A. H.; Heymann, D.; Colbert, D. T.; Lee, R. S.; Fischer, J. E.; Rao, A. M.; Eklund, P. C.; Smalley, R. E., Large-Scale Purification of Single-Wall Carbon Nanotubes: Process, Product and Characterization. Appl. Phys. A 1998, 67, 29–37) and are terminated with carboxylic acid groups. The shortened SWNTs were reacted with thionyl chloride and then octadecylamine to generate the soluble nanotubes (s-SWNTs), which are terminated with amide functionalities (SWNT-CONH(CH$_2$)$_{17}$CH$_3$) (Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98). The iodine-doped SWNTs were generated directly in solution from the reaction of I$_2$ with s-SWNT-CONH(CH$_2$)$_{17}$CH$_3$ in benzene.

EPR Spectroscopy

The EPR spectroscopy was carried out on Varian E-Line and Bruker EMX EPR Spectrometers. Unless noted otherwise, all of the EPR spectra were recorded at a concentration of ~1 mg/1 mL. The samples were contained in melting point tubes inserted into standard EPR tubes. The solvents were tested for EPR signals before the SWNT samples were prepared.

For the as-prepared pristine sample, an unstable suspension was generated by sonication in either ethanol or water. The samples of purified SWNTs and shortened SWNTs were prepared as stable basic suspensions in water by use of a surfactant (Triton X-100). The samples of soluble SWNTs (SWNT-CONH(CH$_2$)$_{17}$CH$_3$) (Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98) were prepared in benzene or carbon disulfide solution. All of the EPR spectra were recorded at room temperature. In order to measure the g-value and the concentration of unpaired electrons in the s-SWNTs, the free radical TEMPO was used as an internal and external reference, respectively.

Pristine SWNTs

The pristine as-prepared SWNT suspension was EPR silent. In the initial report on the preparation of this material, the observation of the EPR signal was complicated by the presence of ferromagnetic catalyst residues which produce an intense line, of width $\Delta H$~400 G at 300 K. In our studies, the poor dispersion of the SWNTs may also contribute to the absence of an EPR signal.

Chemically Purified SWNTs

The chemically purified SWNT sample gave a weak signal with a linewidth, $\Delta H$=2.0 G and g-value of about 2.00. The purification in Liu, J.; Rinzler, A. G.; Dai, H.; Hafner, J. H.; Bradley, R. K.; Boul, P. J.; Lu, A.; Iverson, T.; Shelimov, K.; Huffman, C. B.; Rodriguez-Macias, F.; Shon, Y.-S.; Lee, T. R.; Colbert, D. T.; Smalley, R. E., Fullerenes Pipes. Science 1998, 280, 1253–1255 and Rinzler, A. G.; Liu, J.; Dai, H.; Nilolaev, P.; Huffman, C. B.; Rodriguez-Macias, F. J.; Boul, P. J.; Lu, A. H.; Heymann, D.; Colbert, D. T.; Lee, R. S.; Fischer, J. E.; Rao, A. M.; Eklund, P. C.; Smalley, R. E., Large-Scale Purification of Single-Wall Carbon Nanotubes: Process, Product and Characterization. Appl. Phys. A 1998, 67, 29–37 removes most of the catalytic metals used in the synthesis of the SWNTs. This has been confirmed using Energy Dispersive X-Ray Analysis (EDS) (Chen, Y.; Haddon, R. C.; Fang, S.; Rao, A. M.; Eklund, P. C.; Lee, W. H.; Dickey, E. C.; Grulke, E. A.; Pendergrass, J. C.; Chavan, A.; Haley, B. E.; Smalley, R. E., Chemical Attachment of Organic Functional Groups to Single-Walled Carbon Nanotube Material, J. Mater. Res. 1998, 13, 2423–2431). Furthermore the purified samples gave rise to stable aqueous suspensions.

Shortened SWNTs

Figure 6:
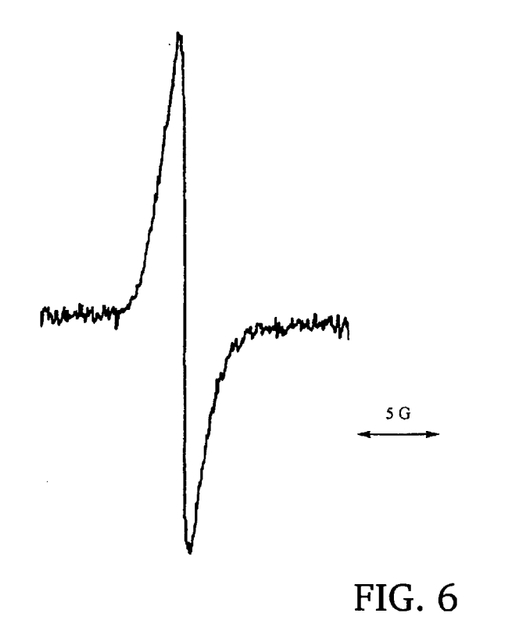
FIG. 6 is the EPR spectrum (9.4 GHz) of shortened SWNTs as an aqueous suspension at room temperature.

The aqueous suspension of shortened SWNTs, gave a strong and symmetrical EPR signal (FIG. 6), with a linewidth, $\Delta H$=1.0 G and g~2.00. Thus the linewidth of the purified SWNTs narrowed on shortening.

Soluble SWNTs

Figure 7:
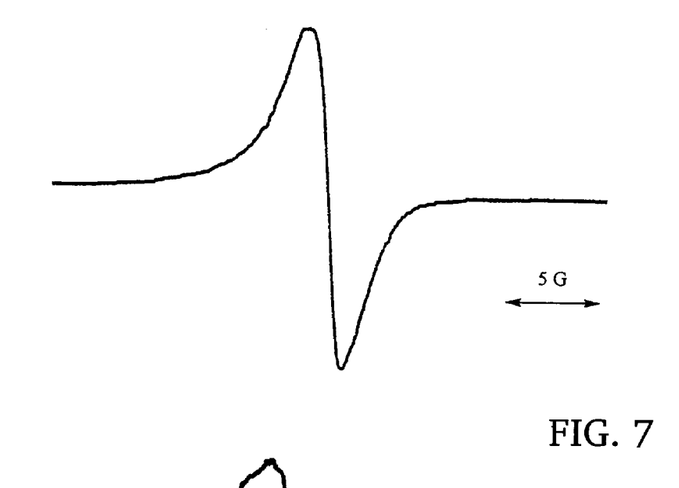
FIG. 7 is the EPR spectrum (9.4 GHz) of s-SWNT-CONH$(CH_2)_{17}CH_3$ in benzene solution at room temperature.

The benzene solution of s-SWNT-CONH(CH$_2$)$_{17}$CH$_3$ (Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98) gave a strong EPR signal (FIG. 7), with g=2.003 "0.001 and $\Delta H$=2.1 G. Thus, within the error of our experiment, s-SWNTs gave a free electron g-value.

Vacuum-annealed (1500 EC) SWNTs gave an EPR signal of line width $\Delta H$~30 G and a Dysonian line shape, with g=2.001"0.001 (Thess, A.; Lee, R.; Nikolaev, P.; Dai, H.; Petit, P.; Robert, J.; Xu, C.; Lee, Y. H.; Kim, S. G.; Rinzler, A. G.; Colbert, D. T.; Scuseria, G. E.; Tomanek, D.; Fischer, J. E.; Smalley, R. E., Crystalline Ropes of Metallic Carbon Nanotubes, Science 1996, 273, 483–487). For multi-walled carbon nanotubes (MWNTs), g-values of 2.012 (Chauvert, O. Forro, L. Phys. Rev. B, 1995, 52, R6963), and 2.000 (Zhou, O.; Fleming, R. M.; Murphy, D. W.; Chen, C. H.; Haddon, R. C.; Ramirez, A. P.; Glarum, S. H. Defects in Carbon Nanostructures, Science 1994, 263, 1744) have been reported. For graphite, values of 2.018 (Chauvert, O. Forro, L. Phys. Rev. B, 1995, 52, R6963) and 2.004 (Zhou, O.; Fleming, R. M.; Murphy, D. W.; Chen, C. H.; Haddon, R. C.; Ramirez, A. P.; Glarum, S. H. Defects in Carbon Nanostructures, Science 1994, 263, 1744) were found.

For the soluble SWNT sample, we were able to measure the approximate spin susceptibility ($P_s$) of the sample, by using TEMPO as an external reference. Neglecting the SWNT end groups, we obtain $P_s$=1.6×10$^{-7}$ emu/mol C, or $P_s$=1.4×10$^{-8}$ emu/g. Previous solid state EPR measurements on MWNTs obtained $P_s$=7×10$^{-9}$ emu/g, and for graphite $P_s$=2×10$^{-8}$ emu/g (Chauvert, O. Forro, L. Phys. Rev. B, 1995, 52, R6963). Temperature-independent Pauli behavior was found in the high temperature regime of the spin susceptibility of the MWNTs (Chauvert, O. Forro, L. Phys. Rev. B, 1995, 52, R6963).

If we assume that the unpaired electrons in our sample originate from the metallic tubes (Pauli susceptibility), then we can follow the previous analysis (Chauvert, O. Forro, L. Phys. Rev. B, 1995, 52, R6963) and obtain the density of states at the Fermi level, N($E_F$)=5×10$^{-3}$ states/eV-atom, and the carrier concentration, n=8×10$^{18}$ cm$^{-3}$ or n=8×10$^{-5}$ spins/C atom. A first-principles band structure calculation reported a value of N($E_F$)=1.5×10$^{-2}$ states/eV-atom for the metallic (10,10) SWNT (Mintmire, J. W., White, C. T., Appl. Phys. A 1998, 67, 65).

On the other hand, if we treat the unpaired electrons as Curie spins, the concentration of localized electrons, n=1.3×10$^{-4}$/C atom.

In either case, with lengths of about 100–300 nm, the soluble shortened nanotubes (Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98 and Chen, Y.; Chen, J.; Hu, H.; Hamon, M. A.; Itkis, M. E.; Haddon, R. C. Solution Phase EPR Studies of Single-Walled Carbon Nanotubes, Chem.

Phys. Lett. 1999, 299, 532–535) have 15,000–50,000 benzenoid carbon atoms, and each s-SWNT carries an average of about 3 unpaired electrons (although not all of the nanotubes are metallic).

With regard to these calculations, it should be noted that considerable variations have been found in the SWNT types (metallic and semi conducting), present in samples of the s-SWNTs (Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98).

Doped SWNTs

Figure 8:
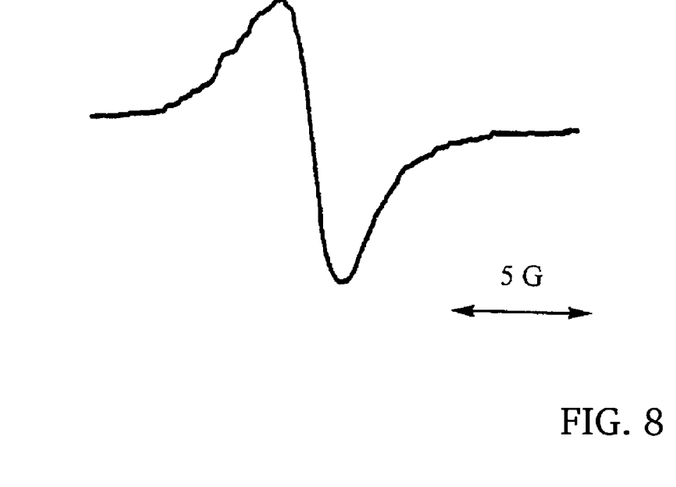
FIG. 8 refers to the EPR spectrum (9.4 GHz) of s-SWNT-CONH$(CH_2)_{17}CH_3$ in benzene solution at room temperature after doping with iodine.

We measured the EPR spectra of suspensions of shortened SWNTs and solutions of s-SWNT-CONH$(CH_2)_{17}CH_3$ (Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98) after iodine doping (FIG. 8). The EPR signals of both samples widened but the g-values were essentially unchanged. The line width of the EPR signal from shortened SWNTs changed from )H=1.0 G to 1.6 G after reaction with $I_2$, while the soluble SWNTs underwent a line width change from) H=2.1 G to 4.7 G.

EPR Line Shapes

All of the EPR line shapes show asymmetry on close inspection. This may originate from incomplete rotational averaging of the asymmetric g-tensor (Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98).

In conclusion, we have measured the EPR spectra of various forms of SWNTs as suspensions and solutions. The purified SWNTs gave a weak EPR signal, whereas both the shortened and the s-SWNTs gave a strong EPR signal. The sensitivity of the EPR technique makes it useful for monitoring the presence of SWNTs in solvents, both as suspensions and solutions (Chen, Y.; Chen, J.; Hu, H.; Hamon, M. A.; Itkis, M. E.; Haddon, R. C. Solution Phase EPR Studies of Single-Walled Carbon Nanotubes, Chem. Phys. Lett. 1999, 299, 532–535). The s-SWNTs (Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98) carry about 1 unpaired electron per 10,000 carbon atoms and give a free electron g-value (Chen, Y.; Chen, J.; Hu, H.; Hamon, M. A.; Itkis, M. E.; Haddon, R. C. Solution Phase EPR Studies of Single-Walled Carbon Nanotubes, Chem. Phys. Lett. 1999, 299, 532–535).

In summary, the method of the present invention includes the preparation of solutions of naked carbon metals and semiconductors in organic solutions including both ionic (charge transfer) and covalent solution phase chemistry with concomitant modulation of the SWNT band structure. It is now possible to obtain well-characterized, highly purified SWNT materials which are suitable for physical property measurements. The s-SWNTs will have a rich chemistry at their ends, the exterior walls and the interior cavity. s-SWNTs are versatile precursors to copolymer materials with distinctive mechanical and electrical properties and as new ligands for metal complexation.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the preferred embodiment of the present invention includes the purifying, shortening and polishing steps in order to increase product yield and purity. These individual steps are, however, optional rather than mandatory. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

What is claimed is:

1. A method of solubilizing single-walled carbon nanotubes in an organic solvent, comprising:

purifying said single-walled carbon nanotubes;

terminating ends of said single-walled carbon nanotubes with carboxylic acid groups;

shortening said single-walled carbon nanotubes;

polishing said single-walled carbon nanotubes;

converting said carboxylic acid groups on said ends of said single walled carbon nanotubes to acid chloride groups;

reacting said acid chloride converted single-walled carbon nanotubes with an amine having a formula $RNH_2$, or $R_1R_2NH$ wherein R, $R_1$ and $R_2$=$CH_3(CH_2)_n$ where n=9–50 or R, $R_1$ and $R_2$=$(C_6H_4)(CH_2)_nCH_3$, where n=5–50; and dissolving said reacted single-walled carbon nanotubes in said organic solvent.

2. The method of claim 1, wherein $RNH_2$ is octadecylamine, 4-dodecylaniline, 4-tetradecylaniline and any mixtures thereof.

3. The method of claim 1, wherein said reacting includes mixing said single-walled carbon nanotubes with said amine without solvent or in a solvent and heating a resulting mixture to 50°–200° C.

4. The method of claim 3, wherein said solvent is selected from a group consisting of toluene, chlorobenzene, dichlorobenzene, dimethylformamide, hexmethylphosphoramide, dimethylsulfoxide and any mixtures thereof.

5. The method of claim 3, further including continuing said heating for at least 96 hours.

6. The method of claim 1, wherein said reacting includes mixing said single-walled carbon nanotubes with said amine without solvent or in a solvent and heating a resulting mixture to 90°–100° C.

7. The method of claim 6, wherein said solvent is toluene.

8. The method of claim 6, further including continuing said heating for at least 96 hours.

9. The method of claim 1, wherein said terminating is completed by adding a mineral acid to an aqueous suspension of said purified carbon nanotubes.

10. The method of claim 1, wherein said converting includes reacting said carboxylic acid groups on said ends of said single-walled carbon nanotubes with a reagent selected from a group consisting of $SOCl_2$, and $PCl_5$ and any mixtures thereof.

11. The method of claim 1, wherein said organic solvent is selected from a group consisting of chloroform, dichloromethane, benzene, toluene, chlorobenzene, 1,2-dichlorobenzene, ether, tetrahydrofuran and mixtures thereof.

12. The method of claim 1, wherein said carbon nanotubes have a length between 1 and 1000 nm and a diameter between 0.5 and 100 nm.

13. A method of solubilizing single-walled carbon nanotubes in an organic solvent, comprising:

terminating ends of said single-walled carbon nanotubes with carboxylic acid groups;

converting said carboxylic acid groups to acid chloride groups;

reacting said acid chloride groups with an amine having a formula $RNH_2$, or $R_1R_2NH$ wherein R, $R_1$ and $R_2=CH_3(CH_2)_n$ where n=9–50 or R, $R_1$ and $R_2=(C_6H_4)(CH_2)_nCH_3$, where n=5–50; and dissolving said reacted single-walled carbon nanotubes in said organic solvent.

14. A solution comprising:

single-walled carbon nanotubes derivatized by terminating open ends of said single-walled carbon nanotubes with carboxylic acid groups, converting said carboxylic acid groups to acid chloride groups, reacting said acid chloride groups with an amine having a formula $RNH_2$, or $R_1R_2NH$ wherein R, $R_1$ and $R_2=CH_3(CH_2)_n$ where n=9–50 or R, $R_1$ and $R_2=(C_6H_4)(CH_2)_nCH_3$, where n=5–50; and an organic solvent.

15. The solution set forth in claim 14, wherein said organic solvent is aromatic or chlorinated.

16. The solution of claim 14 wherein said organic solvent is chloroform.

17. The solution of claim 14 wherein said organic solvent is dichloromethane.

18. The solution of claim 14 wherein said organic solvent is benzene.

19. The solution of claim 14 wherein said organic solvent is toluene.

20. The solution of claim 14 wherein said organic solvent is chlorobenzene.

21. The solution of claim 14 wherein said organic solvent is 1, 2-dichlorobenzene.

22. The solution of claim 14 wherein said organic solvent is ether.

23. The solution of claim 14 wherein said organic solvent is tetrahydrofuran.

* * * * *